United States Patent [19]
Sexton et al.

[11] 3,834,341
[45] Sept. 10, 1974

[54] FLUID-COOLED ENGINE EXHAUST SYSTEM

[75] Inventors: Peter R. L. Sexton, Philadelphia, Pa.; Samuel H. Tibbetts, III, Rockport, Maine

[73] Assignee: Maine Technical Industries Incorporated, Rockport, Maine

[22] Filed: May 18, 1972

[21] Appl. No.: 254,716

[52] U.S. Cl. ............................. 115/.5 R, 285/131
[51] Int. Cl. ............................................. B63j 5/00
[58] Field of Search ............. 115/.5 R, 13; 29/15 R, 29/15 A; 285/131, 133 R, 133 A, 367

[56] References Cited
UNITED STATES PATENTS

| | | | |
|---|---|---|---|
| 900,576 | 10/1908 | Nelson et al. | 115/13 |
| 2,541,205 | 2/1951 | Christophersen | 285/367 |
| 2,650,112 | 8/1953 | Kinkead | 285/133 R |
| 3,206,836 | 9/1965 | Schlussler | 29/157 R |

FOREIGN PATENTS OR APPLICATIONS

| | | | |
|---|---|---|---|
| 1,054,035 | 1/1967 | Great Britain | 285/133 R |
| 1,048,961 | 11/1966 | Great Britain | 285/133 R |

*Primary Examiner*—Trygve M. Blix
*Assistant Examiner*—Stuart M. Goldstein
*Attorney, Agent, or Firm*—Howson & Howson

[57] ABSTRACT

In a water-cooled engine exhaust system for boats having inboard engines wherein exhaust gases from the engine are vented through a shaped conduit, couplings are provided to enable the conduit to be fabricated from a series of straight and curved sections. The sections are composed of coaxial pipes of different diameters which cooperate to provide a central flow passage for exhaust gases and an annular flow passage for the cooling fluid. Each coupling comprises complementary elements which are mounted on the ends of the sections and which are fastened together by means of band clamps. Each element is internally constructed to provide fluid communication between the central and annular passages in adjacent conduit-sections. Special transition coupling members are also provided for the ends of the conduit to supply cooling water to and to remove cooling water from the annular passage.

13 Claims, 7 Drawing Figures

PATENTED SEP 10 1974　　　　　　　　　　　　　3,834,341

FLUID-COOLED ENGINE EXHAUST SYSTEM

The present invention relates to fluid handling systems, and more particularly, the present invention relates to fluid-cooled exhaust systems for use in marine environments.

It is known that boats with inboard engines are provided with exhaust pipes having means to cool the pipes, since the exhaust pipes usually pass through unventilated bilges below deck. If the pipes were not cooled, the temperature in the bilges would rise, possibly causing fires. Moreover, it is desirable to cool the exhaust pipes in order to increase the operational life of the exhaust system.

At present, water-cooled exhaust systems are fabricated from lengths of pipe which are bent into various configurations to meet spatial and other considerations inside the bilge of the boat in which the system is to be installed. The pipes are usually composed of inner and outer pipe-sections which are spaced apart to provide a central flow passage for exhaust gases and an annular passage for cooling water. The lengths of pipe are welded end to end to fabricate an exhaust conduit of a desired configuration.

The aforementioned fabrication method possesses disadvantages. For instance, conduits composed of welded sections are relatively expensive to fabricate because of the skilled labor required to effect leak-resistant welds. Moreover, the sections to be welded must be carefully measured and bent into predetermined configurations since it is not possible to adjust the shape of the conduit to any substantial extent after it is fabricated. Also, in the event that it should become necessary to remove and replace a section of welded conduit due to corrosion or the like, such repairs can be expected to be expensive.

Although some of the disadvantages of a completely welded conduit can be ameliorated by fabricating the conduit from segments which have couplings capable of being bolted together, known couplings are undesirable because it is necessary to provide by-passes around each coupling for the cooling of fluid. Moreover, like the welded conduits, bolted conduits must be accurately laid-out in advance of installation due to the fact that they cannot be adjusted readily after being mounted in the boat.

With the foregoing in mind, it is a primary object of the present invention to provide a relatively inexpensive fluid-cooled exhaust system which is capable of being fabricated with a minimum of skilled labor.

It is another object of the present invention to provide for use in a marine environment a liquid-cooled exhaust system capable of being loosely assembled in a boat before being permanently installed.

As a further object, the present invention provides a marine-engine exhaust system which is fabricated from a series of tubular segments that are releasably connected in end-to-end relation by means of coupling elements, the coupling elements enabling selected ones of the segments to be readily removed and replaced and permitting adjustment of the segments relative to one another during assembly.

It is a still further object of the present invention to provide a coupling which provides leak-resistant fluid communication between the ends of inner and outer flow passages formed by adjacent segments of coaxial pipes.

More specifically, in the present invention a fluid-cooled marine-engine exhaust system is fabricated from a series of curved and straight segments of a conduit each of which has a central exhaust passage surrounded by an annular cooling-fluid passage. The segments are coupled together by means of elements which provide fluid communication between the ends of the exhaust passages in adjacent segments and the annular cooling-fluid passages. The central and annular passages are provided by a pair of coaxial pipes of different diameters, and the pipes are spaced from one another by means of inner and outer flanges which are provided on each coupling element to mount the ends of the pipes. The elements are connected together by means of a constrictive band-clamp which surrounds the peripheries of the elements and which enables adjacent segments of the conduit to be pivotally adjusted relative to one another during assembly when the band engages loosely around the elements. Each element is provided with a central bore which registers with the exhaust passages and means which affords fluid communication between adjacent ends of the annular passages. There is provided sealing means between the elements to prevent leakage of cooling fluid into the exhaust gases and vice versa. In addition, special transition members are provided at the ends of the conduit for admitting cooling fluid into the annular passage and exhaust gases into the central passage and for exhausting the cooling fluid and exhaust gases into a suitable receiver.

These and other objects, features and advantages of the present invention should become apparent from the following description when taken in conjunction with the accompanying drawings, in which.

Figure 3:
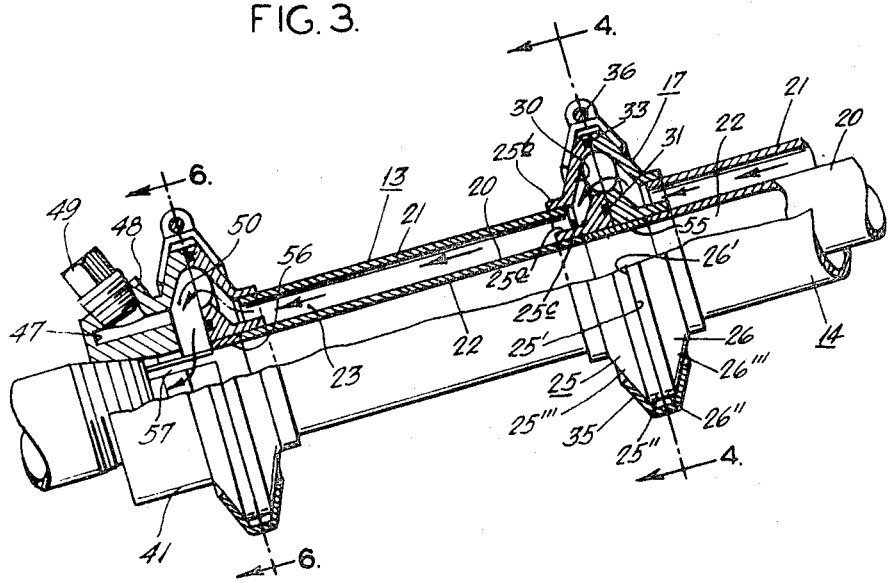
FIG. 3 is a partial sectional view of a straight segment of the exhaust system of FIGS. 1 and 2, the view being of a segment located adjacent the stern of the boat illustrated in FIG. 1.
Figure 4:
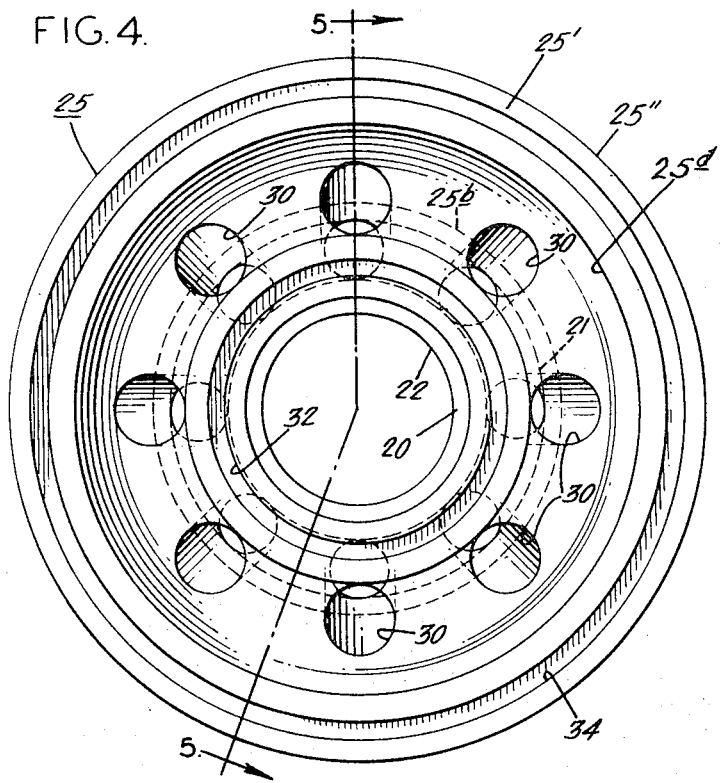
Figure 5:
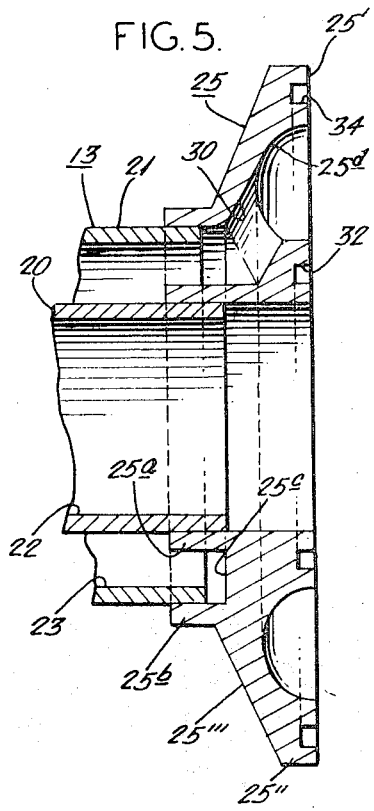
Figure 6:
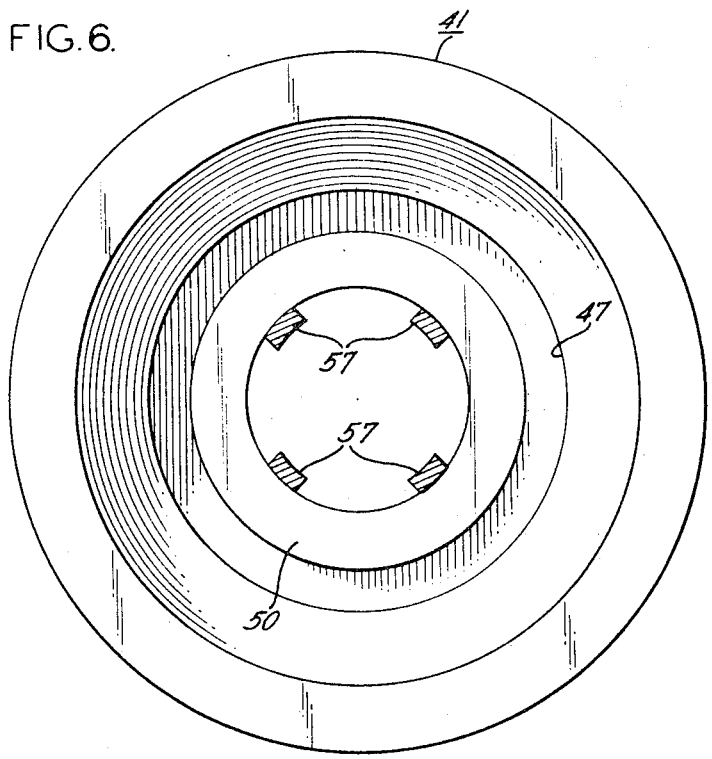

FIGS. 4 and 6 are greatly enlarged sectional views taken along lines 4—4 and 6—6, respectively of FIG. 3;

FIG. 5 is a greatly enlarged sectional view taken along line 5—5 of FIG. 4; and

Figure 1:
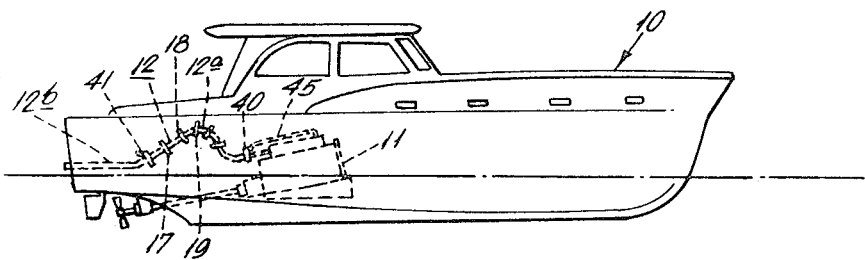
FIG. 1 is a side elevational view of a boat having an exhaust system embodying the present invention.
Figure 7:
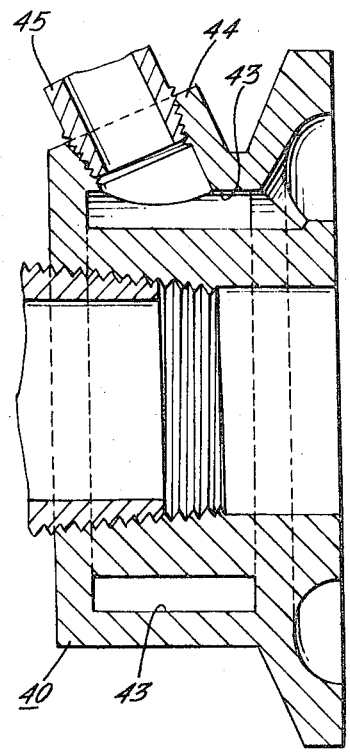

FIG. 7 is a greatly enlarged sectional view taken along a line similar to lines 5—5 of a transition coupling member located adjacent the engine of the boat illustrated in FIG. 1.

Referring now to the drawings, there is illustrated in FIG. 1 a pleasure boat 10 having an inboard engine 11 and a fluid-cooled engine exhaust system embodying the present invention. In the present instance, the exhaust system includes a conduit 12 having a curved portion 12a, located adjacent the engine 11 and a straight portion 12b located toward the stern of the craft 10. Although the conduit is illustrated in a vertical plane, it should be understood that depending on spatial and other considerations such as the locations of structural members below deck, the conduit 12 may curve in different planes.

According to the present invention, the exhaust conduit 12 is fabricated in novel manner which enables installation and maintenance economies to be effected. To this end, the conduit 12 is fabricated from a series of segments such as the segments 13, 14, 15, and 16 which are joined together in end to end relation by means of couplings 17, 18 and 19, respectively. Selected ones of the segments such as the segments 13 and 14 are straight, and selected other ones of the segments such as the segments 15 and 16 are curved, depending on the desired configuration of the conduit 12. As best seen in FIG. 3 each segment comprises a pair of pipes 20 and 21 having walls of different diameters with the pipe 20 having the smaller diameter and being disposed coaxially within the other or outer pipe 21. The wall of the inner pipe 20 forms a central passage 22 through which exhaust gases are flowed, and the wall of the outer pipe 21 cooperates with the wall of the inner pipe to define an annular flow passage 23 for flowing a cooling medium, such as water, along the exhaust passage 22. Preferably, the pipes 21 and 22 are fabricated from corrosion-resistant materials such as stainless steel or the like.

In order to connect the segments together, each coupling, such as the coupling 17, comprises a complementary pair of coupling elements 25 and 26 which mount onto the ends of adjacent segments 13 and 14, respectively of the conduit 12. As best seen in FIG. 3, each coupling element such as the element 25, has a central bore which telescopically receives an end-portion of the inner pipe 20. The element 25 has an inner flange 25a which surrounds the end-portion of the inner pipe 20 and which is secured thereto as be welding or the like. The element 25 also has outer flange 25b which surrounds and telescopically receives the outer pipe 21 and which is secured thereto in a similar manner. The flanges 25a and 25b cooperate to provide an annular recess 25c in registry with the annular flow passage 23. Fluid communication is provided between the annular passages of adjacent segments of the conduit by means of a series of equallyspaced ports 30,30 (FIG. 4) which extend between the recess 25c and into a continuous, shallow, annular channel 25d (FIG. 5). The annular channels 25d of the coupling elements register with one another to afford fluid communication through the coupling irrespective of the coaxial angular position of the elements. Thus, the ports 30,30 need not be in complete registry in order to afford fluid communication, although such registry is desirable in order to reduce fluid pressure loss through the coupling.

In order to prevent fluid from the annular passage 23 from entering the central passage 22 and vice versa, sealing means is provided between the coupling elements 25 and 26. As best seen in FIG. 3, the elements have substantially flat surfaces 25' and 26', respectively, and the surfaces 25' and 26' are disposed normal to the bores in their respective coupling elements. The surfaces 25' and 26' confront and engage one another, and the sealing means is interposed between the surfaces. In the present instance, the sealing means includes an inner O-ring 31 mounted in a groove 32 located in the element 25 between the ports 30,30 and the central flow passage 25a to prevent exhaust gases from flowing out of the exhaust passage 22 and into the peripheral passage 23. The coupling element 25 carrying the O-ring 31 is mounted on one end of a segment of conduit, and the coupling element 26 which does not carry an O-ring is mounted on the other end of the same segment. An outer O-ring 33 is mounted in a groove 34 which surrounds the ports 30,30 to prevent cooling fluid from leaking from the coupling 17. It is noted that the coupling element 26 is identical to the coupling element 25 except for the presence of the concentric grooves 32 and 34 in the coupling element 25.

For the purpose of ensuring a fluid-tight connection of the coupling elements 25 and 26, there is provided means to clamp the elements together. In the present instance, the clamping means includes a band-type clamp such as the clamp 35 which surrounds the peripheries of the elements 25 and 26. The elements 25 and 26 each have circular peripheral surfaces 25'' and 26'' (FIG. 4) and beveled surfaces 25''' and 26''' intersecting the peripheral surfaces, and the clamp 35 has internal surfaces mating with these surfaces. The clamps 35 is constricted around the elements 25 and 26 by means of a threaded element 36 which may be rotated to effect the desired amount of clamping action. The interaction of the band-clamps and the coupling elements permits the coupling elements, and hence the segments connected thereto, to be pivoted and adjusted relative to one another, whereby the exhaust system may be loosely assembled into a predetermined configuration in the boat 10 to ensure a proper fit before the clamps are tightened to effect a permanent installation. As a result, a considerable amount of labor can be saved, notwithstanding the other economies which are effected by fabricating the exhaust system from a series of stock parts.

Figure 2:
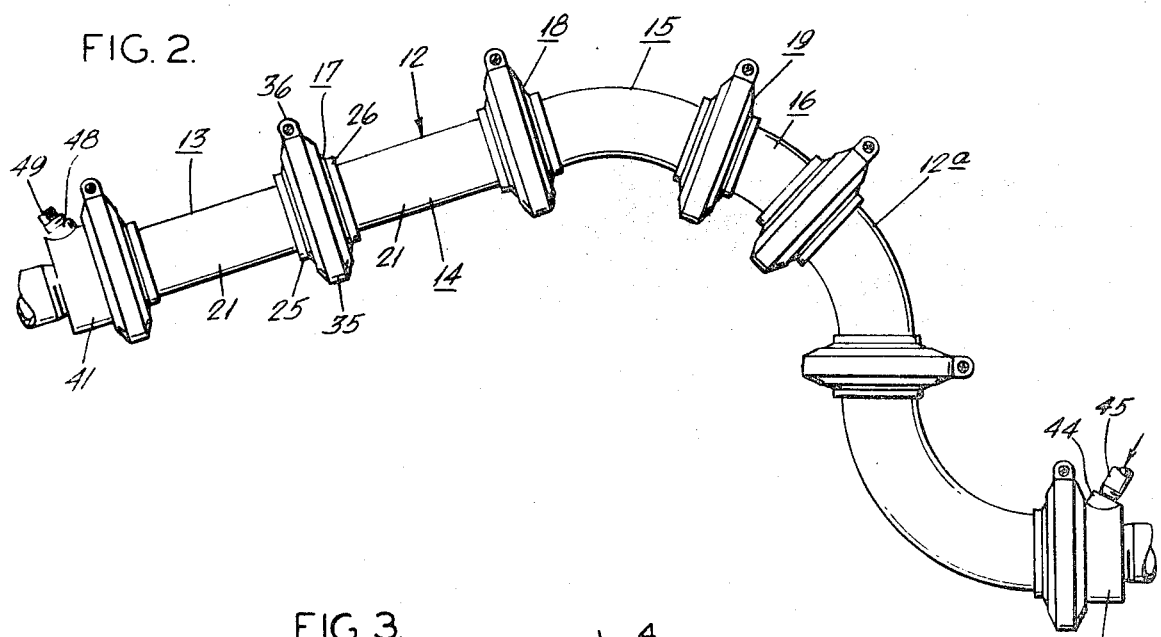
FIG. 2 is an enlarged side elevational view of a portion of the exhaust system illustrated in FIG. 1.

Cooling fluid is admitted to the annular passage 23 at one end of the conduit 12 and is exhausted from the annular passage 23 at the other end of the conduit 12. To this end, transition coupling members 40 and 41 (FIG. 2) are provided at opposite ends of the conduit 12, the coupling members 40 and 41 each being associated with the coupling elements located at the ends of the conduit 12. As best seen in FIG. 7, each transition member, such as the member 40 located adjacent the engine 11, has a bore through which exhaust gases are flowed, and the transition member 40 has a chamber 43 which registers with the ports 30,30 in the associated coupling element for receiving cooling fluid flowing in the annular passage 23. A threaded fitting 44 is provided on the transition coupling 40, the fitting providing fluid communication between the chamber 43 and a source of cooling fluid. The cooling fluid is generally supplied under pressure from a pump which is associated with the engine and which supplies the fluid to the fitting 44 through a conduit 12 through the coupling member 40 flows under pressure through the annular passage 23 in the conduit 12 to the transition member 41 at the other end of the conduit. The fluid is exhausted from the transition member 41 to a suitable receiver.

Depending on the cooling system associated with the engine 11, the transition members 40 and 41 may or may not be alike. For instance, if the engine 11 employs a recirculating cooling system using fresh water or other coolant, the coupling member 41 is identical to the coupling member 40 and the fluid entering the chamber 47 in the coupling member 41 is connected through the fitting 48 and to the engine cooling system by means of piping (not shown). However, if the engine 11 employs a cooling system wherein the cooling fluid is water which is drawn from below the boat, then the coupling member 41 is constructed as illustrated in FIGS. 3 and 6. As seen therein, the fitting 48 of the coupling member 41 is blocked by means of a plug 49, and the chamber 47 is vented into the interior of the exhaust passage 22 through a vent 50. The cooling water thus vented is conveyed with the exhaust gases to the stern of the boat and is comingled with the water from which it was drawn. It is noted that the coupling elements associated with each transition coupling are provided with grooves and 0-rings as the coupling element 25 to provide a leak-resistant connection with the transition couplings.

In order to provide a smooth transition between the adjacent ends of the inner pipes inside the couplings and to assist in maintaining the bores in the coupling elements in proper registry with one another, a sleeve 55 (FIG. 3) is provided in each coupling, such as the coupling 17. The sleeve 55 prevents trans-axial displacement of the coupling elements 25 and 26 relative to one another and cooperates with the band clamp 35 to maintain the coupling elements 25 and 26 in proper alignment with one another. The sleeve 55 also functions to reduce the possibility of leakage between the conduit-passages. It is noted that a sleeve 56 is also provided in the bores of the transition coupling 41 and its cooperating coupling element. However, because of the necessity of maintaining fluid communication between the interior of the chamber 47 and the exhaust passage 22, the sleeve 56 has a set of peripherally-spaced rearwardly extending fingers 57 through which fluid can flow.

As noted heretofore, some of the segments of the conduit 12 are curved and others are straight. Preferably, certain segments are curved through an arc of 45°, while others curve through an arc of 22 ½°. Of course, other standard curvatures such as 30° and 60° may be provided. Moreover, the straight sections may be provided with various standard lengths such as one, two or more feet. It should be understood that the diameters of the pipes may also be varied; however, it is desirable for a standard size to be employed to minimize the necessity of maintaining an excessive inventory of parts.

In order to install the exhaust system in a boat, a workman selects various curved and straight sections and proceeds to assemble the sections. The sections are loosely clamped together inside the craft until the desired conduit configuration is achieved. The sections are then firmly clamped together to effect a permanent leak-resistant installation. In the event that one or more segments of the conduit should corrode and require replacement, the affected segments can be readily removed and replaced.

In view of the foregoing, it should be apparent that there has now been provided a novel fluid-cooled exhaust system which is particularly suited for use in a marine environment and which is relatively inexpensive to install and maintain.

While a preferred embodiment of the present invention has been described in detail, various modifications, alterations and changes may be made without departing from the spirit and scope of the present invention as defined in the appended claims.

We claim:

1. A coupling for joining in end to end relation separate lengths of conduits each having an inner wall defining a central flow passage and an outer wall spaced from the inner wall for defining a peripheral flow passage around said central passage, said coupling comprising: a pair of coupling elements each having a through bore, inner flange means on each element for telescopically engaging an end portion of said inner wall, outer flange means on each element for telescopically engaging an end portion of said outer wall, said inner and outer means defining a recess therebetween, each of said elements having a surface extending outwardly from its bore with said surfaces confronting one another and each surface having an arcuate channel, the channel in one element being in registry with the channel in the other element when said surfaces engage one another so that said elements may be rotated relative to one another about a central axis through their bores while providing fluid communication from one channel to the other, means to clamp said coupling elements together with said bores in registry with one another, said clamp means including a ring surrounding and engaging the peripheries of said elements and means to constrict said ring around said peripheries with said ring permitting relative rotation of said elements when loosely constricted and locking said elements against relative pivotal movement when tightly constricted, means providing fluid communication from one recess to the other to join the peripheral flow passages of the lengths of conduit, said fluid communication means including at least one port in each element extending between said channel and said recess, and sealing means interposed between said surfaces including an inner resilient member surrounding said bore in one of said elements and an outer resilient member surrounding said arcuate channel in one of said coupling elements, whereby separate mediums may be flowed through the central and peripheral flow passages of the joined conduits after said coupling elements are clamped together.

2. Apparatus according to claim 1 wherein each of said elements has a beveled surface intersecting its peripheral surface and said band has similarly beveled surfaces engaging said beveled surfaces on said elements, said beveled surfaces cooperating to align said elements axially with respect to one another.

3. Apparatus according to claim 1 wherein said inner and outer resilient members include 0-rings, and including circular grooves in said one coupling element for receiving said 0-rings.

4. Apparatus according to claim 1 wherein said confronting surfaces of each element are flat and are disposed normal to the bores and wherein said fluid communication means includes a series of spaced ports in each element extending from its recess to its confronting surface.

5. Apparatus according to claim 4 wherein said arcuate channel in each of said confronting surfaces is annular so that said channels are in continuous registry with one another when one element is rotated relative to the other.

6. Apparatus according to claim 1 including a sleeve extending axially in said bores between the ends of the inner walls to maintain said bores in registry with one another.

7. Apparatus according to claim 6 wherein said inner wall is surrounded by said inner flange and said sleeve extends in the bores of the coupling elements between the ends of the inner walls of adjacent lengths to provide a substantially smooth transition from one length of conduit to the other.

8. In a fluid-handling system wherein separate fluids are flowed through a conduit composed of segments of at least an inner and an outer pipe having different diameters and disposed coaxially to define a central flow passage and an annular flow passage between the pipes, the improvement comprising: coupling means joining said segments in end to end relation and having means therein providing fluid communication between the central and annular flow passages of adjacent segments of said conduit, selected ones of said segments of said conduit being arcuate and selected other ones of said segments being straight, so that the conduit may be assembled into a predetermined configuration when said selected segments are arranged in end to end relation, said coupling means including complementary coupling elements each having a central through bore providing fluid communication between the ends of said inner pipes and a surface extending outwardly from said bore, said fluid communication providing means including an arcuate channel located outwardly of said bore in said surface of each element, the channel of one element being in registry with the channel in the other element when said surfaces are disposed in confronting relation, port means providing fluid communication between each channel and the annular flow passage between the pipes connected to the element, means sealingly mounting each element to the ends of each segment, said coupling elements having circular peripheries, clamping means surrounding said peripheries to permit relative rotation between said coupling elements when loosely clamped and to maintain said elements firmly engaged with one another when tightly clamped, and including sealing means interposed between said confronting surfaces, whereby the segments of the conduit may be loosely arranged relative to one another before being securely clamped together.

9. Apparatus according to claim 8 wherein each of said elements has a beveled surface intersecting its peripheral surface, and said clamping means includes a band having mating beveled surfaces engaging said beveled surfaces and means to constrict said band around said surfaces to urge said elements axially toward one another, whereby transaxial displacement between the elements is prevented when the clamping means is tightly constricted around said elements.

10. Apparatus according to claim 8 including a transition coupling member at each end of said conduit, each transition member being associated with one of said elements and each member having a chamber in registry with the fluid communication providing means of its associated element, each transition member also having a bore in registry with the central flow passage in its associated element, means to connect the bore of the transition member at one end of the conduit with a source of a first fluid, means to connect the bore of the transition member at the other end of the conduit to a receiver of the first fluid, and means for flowing a second fluid radially into and out of said flow chambers in said transition members.

11. Apparatus according to claim 10 wherein the transition coupling member at said source end of the conduit includes a fitting providing fluid communication into the interior of its flow chamber.

12. Apparatus according to claim 10 wherein the transition coupling member at said receiver end of the conduit has vents providing fluid communication between its flow chamber and the interior of said inner pipe.

13. Apparatus according to claim 8 including a boat having an inboard engine associated with said fluid-handling system, said central flow passage being in fluid communication with an exhaust-producing outlet of said engine, and said annular flow passage being in fluid communication with a source of cooling fluid.

* * * * *